United States Patent
Kuhr et al.

(10) Patent No.: US 11,919,414 B2
(45) Date of Patent: Mar. 5, 2024

(54) POSITIONING METHOD FOR INDUCTIVELY CHARGING ELECTRIC VEHICLES

(71) Applicant: Volkswagen Aktiengesellschaft, Wolfsburg (DE)

(72) Inventors: Kai Kuhr, Berlin (DE); Max Malchartzeck, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 702 days.

(21) Appl. No.: 17/055,025

(22) PCT Filed: Apr. 12, 2019

(86) PCT No.: PCT/EP2019/059377
§ 371 (c)(1),
(2) Date: Nov. 12, 2020

(87) PCT Pub. No.: WO2019/219307
PCT Pub. Date: Nov. 21, 2019

(65) Prior Publication Data
US 2021/0221244 A1  Jul. 22, 2021

(30) Foreign Application Priority Data
May 14, 2018  (DE) ............... 10 2018 207 394.5

(51) Int. Cl.
*B60L 53/36* (2019.01)
*B60L 53/126* (2019.01)
(Continued)

(52) U.S. Cl.
CPC ............ *B60L 53/36* (2019.02); *B60L 53/126* (2019.02); *B60L 53/305* (2019.02); *B60L 53/39* (2019.02);
(Continued)

(58) Field of Classification Search
CPC .......... B60L 53/36; B60L 53/39; B60L 53/65; B60L 53/126; B60L 53/305; B60L 2240/62; H02J 50/90
(Continued)

(56) References Cited

U.S. PATENT DOCUMENTS

| 9,802,501 B2 | 10/2017 | Krammer |
| 2014/0015328 A1* | 1/2014 | Beaver ...................... H02J 7/34 307/104 |

(Continued)

FOREIGN PATENT DOCUMENTS

| DE | 102014014859 A1 | 4/2016 | ............... G05D 3/12 |
| DE | 102014224455 A1 | 6/2016 | .............. B60L 11/18 |

(Continued)

OTHER PUBLICATIONS

German Office Action, Application No. 102018207394.5, 8 pages, dated Feb. 13, 2019.

(Continued)

*Primary Examiner* — Edward Tso
*Assistant Examiner* — Aaron Piggush
(74) *Attorney, Agent, or Firm* — Slayden Grubert Beard PLLC

(57) ABSTRACT

The invention relates to a method involving a vehicle or an inductive charging station for positioning the vehicle on the inductive charging station, at least having the method steps: determining vehicle-specific first identification information; determining charging station-specific second identification information; transmitting the first identification information and the second identification information to a storage apparatus; receiving positioning information, assigned to the combination of first identification information and second identification information, from the storage apparatus. The invention furthermore relates to a method involving a stor- (Continued)

age apparatus, having the method steps: receiving vehicle-specific first identification information and charging station-specific second identification information from a vehicle or a charging station; determining or updating positioning information with at least one item of information about a signal strength of at least one electromagnetic signal used to position the vehicle on the charging station; and transmitting the positioning information to the vehicle or to the charging station.

20 Claims, 6 Drawing Sheets

(51) Int. Cl.
*B60L 53/30* (2019.01)
*B60L 53/39* (2019.01)
*B60L 53/65* (2019.01)
*H02J 50/90* (2016.01)

(52) U.S. Cl.
CPC .............. *B60L 53/65* (2019.02); *H02J 50/90* (2016.02); *B60L 2240/62* (2013.01)

(58) Field of Classification Search
USPC ........................................ 320/104, 108, 109
See application file for complete search history.

(56) References Cited

U.S. PATENT DOCUMENTS

| | | | |
|---|---|---|---|
| 2015/0042168 A1* | 2/2015 | Widmer ................ | B60L 53/126 |
| | | | 307/104 |
| 2015/0298558 A1* | 10/2015 | Lewis ..................... | B60L 53/36 |
| | | | 701/22 |
| 2017/0129358 A1 | 5/2017 | Taniguchi ...................... | 307/104 |
| 2017/0136883 A1 | 5/2017 | Ricci et al. .................... | 320/108 |
| 2018/0083349 A1* | 3/2018 | Sieber ..................... | H02J 50/90 |
| 2019/0066500 A1 | 2/2019 | Roth et al. | |
| 2019/0255965 A1* | 8/2019 | Hocke ..................... | B60L 53/36 |
| 2019/0315244 A1* | 10/2019 | Bartz ..................... | B60L 53/60 |

FOREIGN PATENT DOCUMENTS

| | | | | |
|---|---|---|---|---|
| DE | 102015004752 A1 | 10/2016 | ............. | B60L 11/18 |
| DE | 102016001907 A1 | 8/2017 | ............. | G01C 21/34 |
| DE | 102018207394 A1 | 11/2019 | ............. | B60W 30/06 |
| EP | 2921376 B1 | 9/2015 | ............. | B60L 11/18 |
| WO | 2019/219307 A1 | 11/2019 | ............. | B60L 53/126 |

OTHER PUBLICATIONS

International Search Report and Written Opinion, Application No. PCT/EP2019/059377, 24 pages, dated Jul. 16, 2019.

\* cited by examiner

POSITIONING METHOD FOR INDUCTIVELY CHARGING ELECTRIC VEHICLES

CROSS-REFERENCE TO RELATED APPLICATIONS

This application claims priority to German Patent Application No. DE 10 2018 207 394.5, filed on May 14, 2018 with the German Patent and Trademark Office. The contents of the aforesaid Patent Application are incorporated herein for all purposes.

TECHNICAL FIELD

The invention relates to a positioning method for inductively charging electric vehicles, in particular a method for positioning an electric vehicle over an inductive charging plate, and a method for creating a database with positioning user data.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

According to surveys, inductive charging of electric vehicles is achieving greater acceptance among end consumers than cable-based charging, thus also increasing the willingness to use electric vehicles in general. Not least as a result of this, inductive charging is becoming increasingly important and has the opportunity to make the use of charging cables largely unnecessary, at least as a standard charging method.

Efforts are currently being made to standardize suitable inductive charging systems, which generally have a vehicle component and an infrastructure component. In terms of physics, in particular the shape and position of the coils in the vehicle and a parking space should be standardized. In order to also be able to ensure interoperability between charging systems from different manufacturers, uniform protocols for communication between the vehicle and infrastructure components should also be defined.

In addition to standardization, there are a plurality of problems that must still be confronted before inductive charging can be introduced on a large scale. This includes compliance with safety regulations, for example regarding the maximum radiation exposure or recognition of foreign objects between the charging coils, as well as ensuring that the charging process is sufficiently efficient. For the latter, it is particularly important that the vehicle and infrastructure coils are positioned as precisely as possible.

Various methods for positioning an electric vehicle for initiating an inductive charging process are already known from the prior art. In particular, two types of methods, namely LPE and LF positioning methods, are the focus of standardization. While in the LPE—low power emission—method a weak magnetic field signal from the charging coils themselves is used for positioning, in the LF—low frequency—method the position is determined by means of additional transceivers.

One problem with the known positioning methods is the fact that electromagnetic signals are dependent on changing surrounding conditions, including of the electric vehicle itself. Therefore, even in the case of standardized systems, actually received signal values can fluctuate so strongly that a repeated exact positioning of vehicles is made difficult. However, several approaches are known from the prior art that should ensure reliable and surroundings-independent positioning of an electric vehicle.

The known methods typically require additional modifications to the infrastructure or the electric vehicles. While the modifications to the vehicles make standardization difficult, the additional modifications to the infrastructure usually depend on the willingness and ability of private owners and are therefore difficult to ensure on a large scale.

SUMMARY

An object exists to overcome or at least reduce the disadvantages of the prior art and provide positioning methods for inductively charging electric vehicles that enable exact positioning of the motor vehicle on the charging coil regardless of the surrounding conditions in a given case.

The object is solved by the subject matter of the independent claims. Embodiments of the invention are discussed in the dependent claims and the following description.

DESCRIPTION

Figure 1:
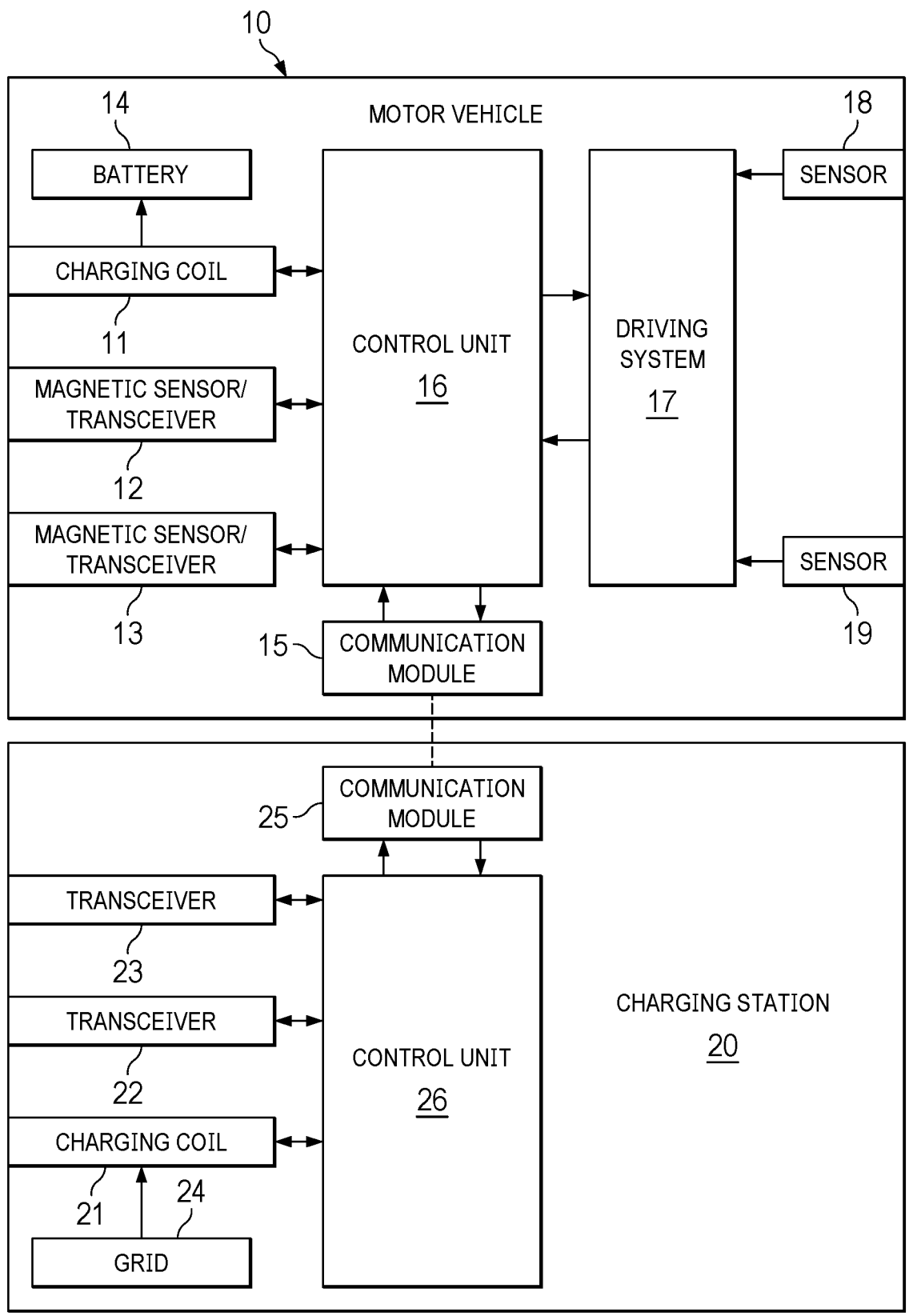
FIG. 1 shows a schematic representation of a motor vehicle and a charging station according to one embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for positioning a vehicle on an inductive charging station, for example to support the positioning of a vehicle on an inductive charging station. The method is carried out by the vehicle, e.g., an electric or hybrid vehicle, and/or the charging station.

In the method according to the present aspect, vehicle-specific first identification information is first determined. The first identification information may contain information at least on the vehicle type, for example in the form of a key number or a model name, and also may contain information on the inductive charging system of the vehicle and/or on a positioning system of the vehicle. The first identification information also may clearly identify the vehicle, for example in the form of a vehicle identification number. However, it is essential that the first identification information codes or contains type information of the vehicle.

In the method according to the present aspect, charging station-specific second identification information is then determined. This second identification information may contain information on the type of the inductive charging station, for example in the form of a type number or similar. In addition, the second identification information may contain information on the equipment of the inductive charging station, such as the size of the charging coil, the charging current, and the type of positioning system used. The second identification information also may clearly identify the inductive charging station, for example in the form of an identification number and/or position of the charging station.

The first identification information and the second identification information are, e.g., determined by calling up the information from an internal memory of the vehicle or charging station and, if necessary, transmitting the called up information from the vehicle to the charging station (if the charging station carries out the method) or from the charging station to the vehicle (if the vehicle carries out the method) via a data connection.

According to the present aspect, the determined first identification information and second identification information are transmitted to a storage apparatus, as specified in more detail in the following. Positioning information for supporting the positioning of a vehicle defined by the first identification information on the charging station defined by the second identification information is stored in this storage apparatus. Based on the transmitted identification information, the storage apparatus determines positioning information assigned to the combination of first and second identification information. According to the present aspect, this positioning information is then received by the charging station and/or the vehicle from the storage apparatus and can be used to support a positioning method, as described in detail below.

The method beneficially enables server-based or cloud-based support of positioning methods of vehicles on inductive charging stations, taking into account the concrete combination of vehicle and charging station. It has been shown that even in standardized positioning methods, the process parameters for positioning of employed systems depend greatly on the concrete situation. A dependence on predefined values, for example in the form of limit values, would therefore regularly lead to unsatisfactory positioning results. By using the positioning information according to the present aspect, such process parameters, such as limit values, can be adapted to the concrete combination of vehicle and charging station and thus the positioning result can be improved.

The method for positioning a vehicle on an inductive charging station may, e.g., have the method steps: determining vehicle-specific first identification information; determining charging station-specific second identification information; transmitting the first identification information and the second identification information to a storage apparatus; and receiving positioning information from the storage apparatus, wherein the positioning information has at least one item of information about a signal strength of at least one electromagnetic signal that is used to position a vehicle defined by the first identification information on the charging station defined by the second identification information.

The storage apparatus is for example a vehicle-external storage apparatus. This is for example accessed via a communication apparatus of the vehicle (wireless) or of the charging station (wireless or wired). The storage apparatus, for example a back-end server, may store positioning information for a plurality of vehicles and for a plurality of charging stations. Transmitting information to the storage apparatus is explained in detail below. Thus, information determined once by one vehicle of a specific type for one charging station of a specific type, for example a specific charging station, can be used for other vehicles of the same type, for a charging process on a charging station of the same type, or respectively the same charging station.

In some embodiments, a signal strength of at least one electromagnetic signal used to position a vehicle defined by the first identification information on the charging station defined by the second identification information is detected. In this case, the electromagnetic signal can be emitted by the charging station and detected by the vehicle or emitted by the vehicle and detected by the charging station. The signal is for example a magnetic field or a low-frequency electromagnetic wave, as explained in detail below. The signal strength is for example detected by the vehicle or the charging station. The signal strength is, e.g., detected in the charging position of the vehicle.

In some embodiments, the first identification information and the second identification information are transmitted together with the detected signal strength to the storage apparatus. For example, the detected signal strength is transmitted beforehand from the charging station to the vehicle or from the vehicle to the charging station. The first identification information and the second identification information are stored in the storage apparatus in combination with the detected signal strength. The information about the detected signal strength of the signal used for positioning is the minimum required positioning information data, which, however, can also contain other information.

The first and second identification information may, e.g., be transmitted together with the detected signal strength to the storage apparatus independently of calling up positioning information from the storage apparatus, for example if no positioning information is stored yet for the concrete combination of first and second identification information. In this case, it is a type of initial calibration for the concrete combination of vehicle and charging station. The signal strength was for example detected at the charging position of the vehicle on the charging station. Such a calibration is necessary for example when formally standard-conforming systems from different manufacturers, for example in relation to vehicle and charging station, come together.

A detected signal strength is also, e.g., transmitted together or subsequently to calling up already stored positioning information for the first and second identification information. Thus, additional data on concrete combinations of vehicle and charging station is continuously transmitted to the storage apparatus. This is for example used by the storage apparatus to continuously adapt the positioning information. Thus, all vehicles of the same type beneficially contribute to building a data basis for a positioning method of such a vehicle on a charging station of a specific type, for example a specific charging station. The positioning information may be, e.g., at least partially determined by statistical analysis, for example averaging, of the received signal strengths.

The positioning information that is called up by the vehicle or charging station from the storage apparatus thus, e.g., has at least one item of information about a signal strength of at least one electromagnetic signal that is used to position a vehicle defined by the determined first identification information on the charging station defined by the determined second identification information. The at least one determined signal strength relates in this case, e.g., to at least one signal strength detected in the charging position of the vehicle on the charging station. The positioning information also may have a maximum signal strength of the at least one electromagnetic signal used for positioning. The method beneficially enables positioning support of a vehicle on a charging station by means of electromagnetic signals in that deviations of a detected signal strength caused by the vehicle (and surroundings) can be taken into account.

The positioning of vehicles on an inductive charging station usually may include detecting at least one electromagnetic signal. An optimal charging position is assumed, for example, when a global maximum of at least one received signal is detected. The amount of the global maximum may, despite standardization, depend greatly on the respective combination of vehicle and charging station (and on the surroundings). This means that if a global maximum with a predetermined signal strength is sought, this can lead to erroneous positioning. By using the positioning information, which, for example, enables adapted values for the global maximum, an improved, for example quicker, positioning method is beneficially achieved.

It is also conceivable for an optimal charging position to be assumed when a signal emitted by a transmitter on the charging station (or the vehicle) is detected by multiple receivers on the vehicle (or the charging station) with the same signal strength and therefore equidistance between the transmitter and receivers is indicated. However, due to design differences, for example in the underbody of different vehicle types, the signals actually detected by the individual receivers in an optimal charging position can deviate from each other. In such a case, the positioning information can contain, for example, correction values relating to the deviations of the signal strength at the receivers.

In some embodiments, the method for positioning a vehicle on an inductive charging station has the method steps: determining vehicle-specific first identification information; determining charging station-specific second identification information; detecting a signal strength of at least one electromagnetic signal that is used to position a vehicle defined by the first identification information on the charging station defined by the second identification information; and transmitting the first identification information, the second identification information, and the detected signal strength to a storage apparatus.

In some embodiments, navigation information is also determined based on the positioning information and the detected signal strength. As already described, the positioning information contains at least one item of information about a signal strength of an electromagnetic signal that is used to position the vehicle defined by the first identification information on the charging station defined by the second identification information. This item of information will regularly relate to a target signal strength. By comparing it to a currently detected signal strength, e.g., to a signal strength gradient determined based on two detected signal strengths, navigation information may be determined provided that a currently detected signal strength matches with the target signal strength.

In some embodiments, the vehicle defined by the first identification information is guided into an optimal charging position on the charging station defined by the second identification information based on the determined navigation information. In this case, the optimal charging position is defined such that at least one currently detected signal strength largely corresponds to at least one signal strength contained in the positioning information. A permissible deviation may, e.g., be transmitted with the positioning information and also may decrease with the size of the data basis of the positioning information. Guiding the vehicle in this case includes carrying out autonomous driving maneuvers by the vehicle and/or displaying driving instructions for a driver of the vehicle.

In some embodiments, the method comprises determining surroundings-specific third identification information depending on variable and/or invariable surrounding conditions of the charging station. Invariable surroundings information relates, for example, to the structural surroundings of the charging station, such as the presence of walls surrounding the charging station. Variable surroundings information relates, for example, to the presence of vehicles in neighboring parking spaces or at neighboring charging stations. These surrounding conditions are, e.g., detected by means of sensors installed in the vehicle and/or in the charging station. Modern vehicles comprise a plurality of sensors, such as ultrasonic or LIDAR detectors or cameras, that can be used to detect the surrounding conditions. The third identification information represents concrete surroundings information, e.g., on a plurality of predetermined characteristic values that enable a distinction between a limited number of surrounding conditions.

In some embodiments, the third identification information is transmitted to the storage apparatus. The storage apparatus, e.g., also uses the third identification information to generate positioning information. According to the present embodiments, the positioning information has at least one item of information about a signal strength of at least one electromagnetic signal that is used to position (i) a vehicle defined by the first identification information (ii) on the charging station defined by the second identification information (iii) under the surrounding conditions defined by the third identification information.

In some embodiments, the vehicle is also inductively charged on the charging station following the improved positioning of the vehicle on the charging station. In some embodiments, an efficiency of the inductive charging process is determined and transmitted to the storage apparatus. The efficiency determined in this way is, e.g., used as a weighting factor for the signal strength of the at least one detected signal that is transmitted together with the efficiency to the charging station. This weighting factor is, e.g., taken into account when generating the positioning information based on the received signal strengths. Alternatively, transmitting the at least one detected signal strength to the storage apparatus can be completely omitted if the efficiency of the charging process falls below a predetermined limit value.

In some embodiments, a low-frequency electromagnetic signal is emitted from at least one transmitter in the charging station or in the vehicle as the at least one electromagnetic signal. A received field strength of the at least one electromagnetic signal is also detected by at least one receiver in the vehicle or at least one receiver in the charging station.

In some embodiments, a plurality, for example two, transmitters and a plurality, for example four, receivers are used. The low-frequency electromagnetic signal is, e.g. a signal in the kilohertz range, for example a signal between 100 kHz and 200 kHz and especially 125 kHz. In these embodiments, an LF positioning method is therefore used.

In an LF positioning method, for example, electromagnetic signals emitted by multiple transmitters in the vehicle are received by multiple receivers in the charging station and the signal strength of the received signals is detected. Indicators for the received signal strengths, for example Received Signal Strength Indicator—RSSI, are then transmitted from the charging station via a data connection to the vehicle and a positioning of the vehicle is carried out based on these signal strengths. A positioning of the vehicle is successful, for example, when the RSSIs from all receivers are the same.

Depending on the respective combination of vehicle and charging station and perhaps the surroundings, the RSSIs at the charging position determined in the LF positioning method may, however, deviate from the expected RSSIs. The positioning information received by the storage apparatus therefore, e.g., contains correction values for the RSSIs expected in the optimal charging position. In addition, the vehicle transmits the RSSIs received in the final charging position, e.g., together with an efficiency of the charging process, to the storage apparatus. Based on these RSSIs, for example taking into account the received efficiency, the storage apparatus then determines or updates the positioning information for this combination of vehicle and charging station.

In some embodiments, a charging coil of the inductive charging station (or of the vehicle) emits a magnetic field as the at least one electromagnetic signal used for positioning. Furthermore, a charging coil and/or at least one magnetic field sensor of the vehicle (or of the charging station) detects a local field strength of the emitted magnetic field. The magnetic field is for example a low-energy magnetic field with field strengths that are much lower than those of the magnetic field used for charging. For example, a quasi-stationary magnetic field that is pulsed at a low frequency is emitted. This beneficially enables a differential measuring principle and does not create eddy currents. In these embodiments, an LPE positioning method is therefore used.

In an LPE method, an optimal charging position is assumed when a global maximum of the magnetic field signal is detected. Furthermore, a route or navigation information about an optimal charging position can be determined based on a determined gradient of the magnetic field. The amount of the global maximum may depend on the respective combination of vehicle and charging station and perhaps on the surroundings. It can therefore be difficult in an individual case to differentiate between local maximums and the global maximum if no information about the field strength at the global maximum is available.

In some embodiments, the positioning information received by the storage apparatus contains the field strength expected at the global maximum of the magnetic field. This information can be used to support a positioning process of the vehicle on the charging station. In addition, the vehicle transmits the highest measured field strength, meaning the magnetic field strength detected in the final charging position, for example together with an efficiency of a charging process carried out at this position, to the storage apparatus. Based on this maximum field strength, e.g., taking into account the received efficiency, the storage apparatus then determines or updates the positioning information for this combination of vehicle and charging station.

Another exemplary aspect relates to a method involving a storage apparatus, e.g., a storage apparatus as described above. The method according to the present aspect involving the storage apparatus comprises receiving vehicle-specific first identification information and charging station-specific second identification information from a vehicle defined by the first identification information or a charging station defined by the second identification information. Based on this received identification information, the storage apparatus transmits positioning information with at least one item of information about a signal strength of at least one electromagnetic signal used to position the vehicle on the charging station. In this case, the signal strength is the signal strength of the electromagnetic signal in the final charging position and/or the maximum signal strength of the electromagnetic signal. The storage apparatus also transmits the positioning information to the vehicle or to the charging station.

In some embodiments, the method also comprises receiving a detected signal strength of at least one electromagnetic signal that is used to position a vehicle defined by the first identification information on the charging station defined by the second identification information. Based on the detected signal strength, positioning information about the combination of received first identification information and second identification information is generated or updated.

In some embodiments, the storage apparatus receives surroundings-specific third identification information depending on variable and/or invariable surrounding conditions of the charging station and/or the vehicle. According to these embodiments, the storage apparatus determines or updates the positioning information based on the first, second and third identification information.

The method steps of the methods discussed herein can be implemented by electrical or electronic parts or components (hardware), by firmware (ASIC), and/or achieved by executing a suitable program (software).

The methods may be provided or implemented by a combination of hardware, firmware, and/or software. For example, individual components for carrying out individual method steps may be designed as a separately integrated circuit or arranged on a joint integrated circuit.

In some embodiments, components configured to carry out individual method steps are arranged on a printed (flexible) circuit carrier (PCB), a tape carrier package (TCP), or another suitable substrate.

The individual method steps may be designed as one or more processes that run on one or more processors in one or more electronic computing devices and are created when executing one or more computer programs.

In this case, the electronic computing devices are for example designed to work together with other components, for example one or more sensors or cameras, to achieve the functionalities described here.

The computer programs in this case are, e.g., saved in a volatile memory, for example a RAM element, or in a non-volatile storage medium, such as a CD-ROM, a flash memory or the like.

A person skilled in the art will see that the functionalities of multiple computers (data processing devices) may be combined or may be combined in a single device or that the functionality of a specific data processing device can be distributed on a plurality of devices to execute the steps of the methods discussed herein without deviating from the scope of this disclosure.

Another exemplary aspect relates to a motor vehicle designed to carry out the method(s) described herein, for example an electric or hybrid vehicle. The vehicle for example has an inductive charging system with a charging coil and a control unit designed to carry out the method(s) as described herein.

Another exemplary aspect relates to an inductive charging station designed to carry out the method(s) described herein. The charging station according to the present aspect, e.g., has a charging coil, a connection to an electric grid, and a control unit designed to carry out the method(s) as described herein.

Another exemplary aspect relates to a storage apparatus designed to carry out the method(s) described herein. The storage apparatus according to the present aspect, e.g., has a data storage structure, a communication module for data communication with the vehicle or the charging station, and a control unit designed to carry out the method.

Another exemplary aspect relates to a computer program product that comprises commands, upon the execution of which a method is carried out as described above. Another exemplary aspect relates to a computer-readable storage medium comprising commands that, when executed by a vehicle, a charging station, or a storage apparatus, each as described above, cause the vehicle, charging station, or storage apparatus to execute a method as described above. In this case, the storage medium is, e.g., a volatile memory, for example a RAM element, or a non-volatile memory, such as a flash memory or the like.

Other embodiments result from the remaining features specified in the dependent claims. The various embodiments mentioned herein can beneficially be combined with one another, if not stated otherwise.

The invention will be further explained in exemplary embodiments below based on the associated drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation, in particular a block diagram, of an exemplary motor vehicle 10, in particular a two-track motor vehicle 10 with an electric or hybrid motor. The motor vehicle 10 comprises a charging coil 11 for inductive charging of the motor vehicle 10, in particular of a vehicle battery 14 of the motor vehicle 10.

According to a first embodiment, the vehicle 10 also has two magnetic sensors 12, 13. According to a second embodiment, the motor vehicle 10 has two transceivers 12, 13 for electromagnetic waves, in particular waves in a low-frequency range up to multiple hundred kilohertz. The charging coil 14 and the magnetic sensors 12, 13 or transceivers 12, 13 are designed to communicate with a control unit 16 of the motor vehicle 10.

The motor vehicle 10 also has a communication module 15 with one or more data transponders. The data transponders are a radio, WLAN, GPS or Bluetooth transceiver or the like. The communication module 15 communicates with the control unit 16, for example via a suitable data bus. In addition, the communication module 15 communicates with a communication module 25 of an exemplary charging station 20.

The motor vehicle 10 also has a driving system 17 that is configured for autonomous driving operation, in particular longitudinal and transverse guidance, of the motor vehicle 10. The driving system 17 is designed to calculate maneuvers based on navigation information and communicates with the control unit 16.

The motor vehicle 10 also has a plurality of sensors 18, 19. The sensors 18, 19 are sensors for determining the current position, movement, and surroundings information of the motor vehicle 10, such as speed sensors, acceleration sensors, inclination sensors, LIDAR distance sensors, cameras and the like. The sensors 18, 19 transmit their measurement results directly to the driving system 17 and can also have direct communication connections (not shown) to the control unit 16.

The motor vehicle 10 also has the control unit 16, which is configured to carry out the methods according to the present disclosure involving a motor vehicle 10, as explained in detail in the following. For this purpose, the control unit 16 for example has an internal memory and a CPU which communicate with each other, for example via a suitable data bus. In addition, the control unit 16 is in communication connection with at least the charging coil 11, the sensors 12, 13, the communication module 15, and the driving system 17, for example via a CAN, SPI or other connection.

The exemplary charging station 20 has a charging coil 21 which is configured to transfer a charging current inductively to the charging coil 11 of the motor vehicle 10. To receive the charging current, the charging coil 21 of the charging station 20 is connected to an electrical grid 24.

According to one embodiment, the charging station 20 also has two transceivers 22, 23 for electromagnetic waves, in particular in a low-frequency range up to multiple hundred kilohertz. Both the charging coil 21 and the transceivers 22, 23 are designed to communicate with a control unit 26 of the charging station 20.

The charging station 20 also has a communication module 25 with one or more data transponders. The data transponders are a radio, WLAN, GPS or Bluetooth transceiver or the like. The communication module 25 communicates with the control unit 26, for example via a suitable data bus. In addition, the communication module 25 of the exemplary charging station communicates with the communication module 15 of the exemplary motor vehicle 10.

The charging station 20 also has the control unit 26, which is configured to carry out the methods according to the present disclosure involving a charging station 20, as explained in detail in the following. For this purpose, the control unit 26 for example has an internal memory and a CPU which communicate with each other, for example via a suitable data bus. In addition, the control unit 26 is in communication connection with at least the charging coil 21, the sensors 22, 23, and the communication module 25, for example via a CAN, SPI or other suitable data connection.

Figure 2:
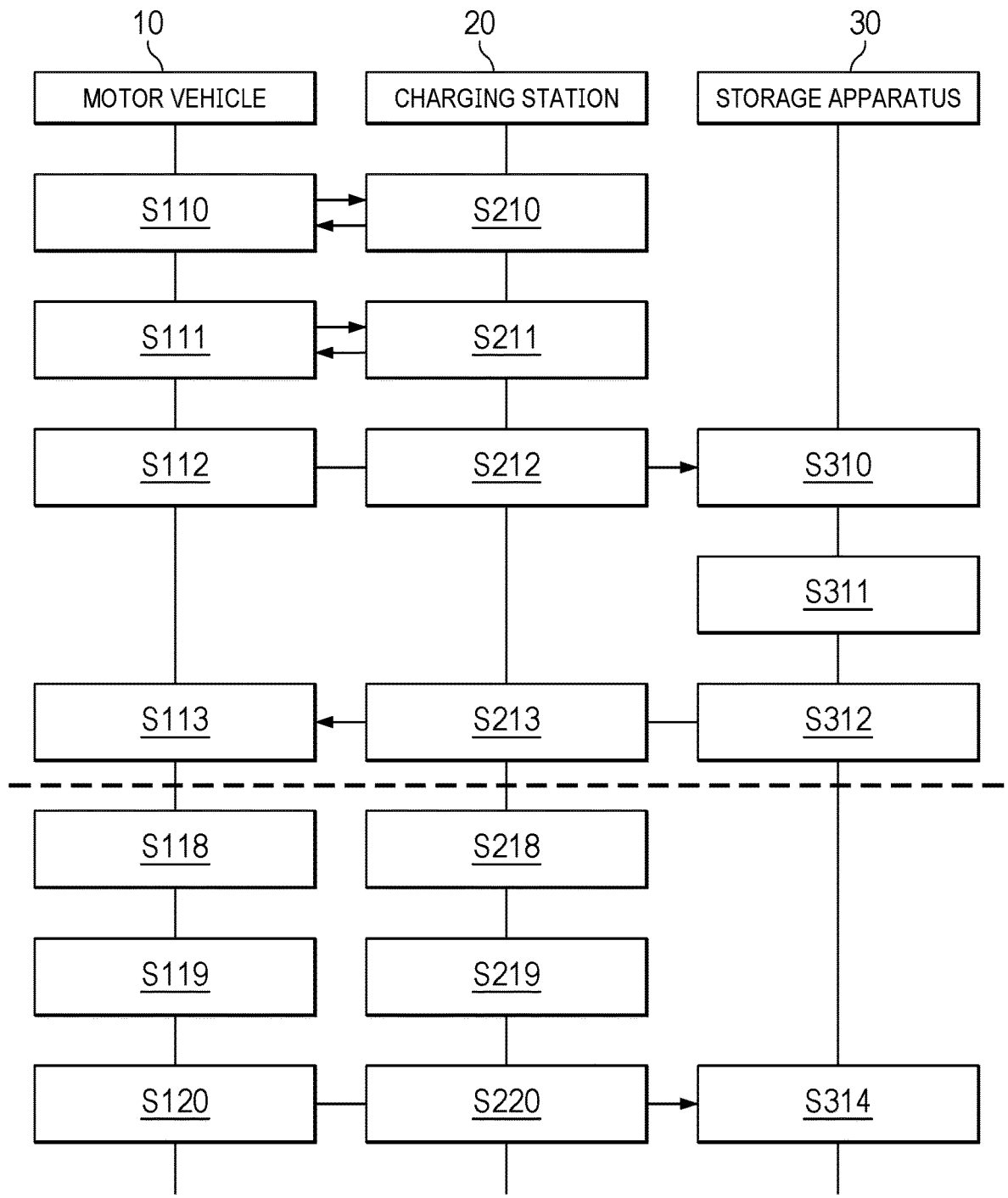
FIG. 2 shows a schematic flow chart of methods according to a first embodiment.

FIG. 2 shows a schematic flow chart of methods according to a first embodiment. In particular, FIG. 2 shows a flow chart of a method involving a vehicle 10 and/or a charging station 20 as well as a storage apparatus 30.

In a first step S110, the vehicle 10 determines vehicle-specific first identification information by calling it up from an internal memory. Alternatively, in a first step S210, the charging station 20 determines vehicle-specific first identification information by retrieving it from the vehicle 10 via a data connection.

In principle, the steps of the methods can be carried out either by the vehicle 10 and/or the charging station 20. This is made clear by indicating a step S10 in the form of the steps S110 for the step of the vehicle 10 and S210 for the corresponding step S210 of the charging station 20.

In the following, carrying out the methods is described only for the vehicle 10, without, however, limiting the subject matter of the invention to this. It is evident that all or at least some of the steps of the methods can also be executed by the charging station 20. For this purpose, communication between the vehicle 10 and the charging station 20, as described above in the example of the first identification information, may be necessary. Such communication for example takes place via the communication modules 15, 25 as described with reference to FIG. 1.

In a second step S111, the vehicle 10 determines charging station-specific second identification information by retrieving it from the charging station 20 via a data connection. In a third step S112, the vehicle 10 transmits the first and second identification information to the storage apparatus 30.

The storage apparatus 30 receives the first and second identification information in a first step S310 of the method involving the storage apparatus 30. In a second step S311 of the method involving the storage apparatus 30, it determines positioning information with at least one item of information about a signal strength of at least one electromagnetic signal used to position the vehicle 10 on the charging station 20. In a third step S312 of the method involving the storage apparatus 30, it transmits positioning information to the vehicle 10 which receives the information in step S113 of the method involving the vehicle 10.

An embodiment of the methods is shown below the dotted line in FIG. 1. Therein, the vehicle 10 is inductively charged on the charging station 20 in a step S118. In the step S119, an efficiency of the inductive charging process is determined and in a step S120 transmitted to the storage apparatus 30. The storage apparatus receives the efficiency in a step S314.

Figure 3:
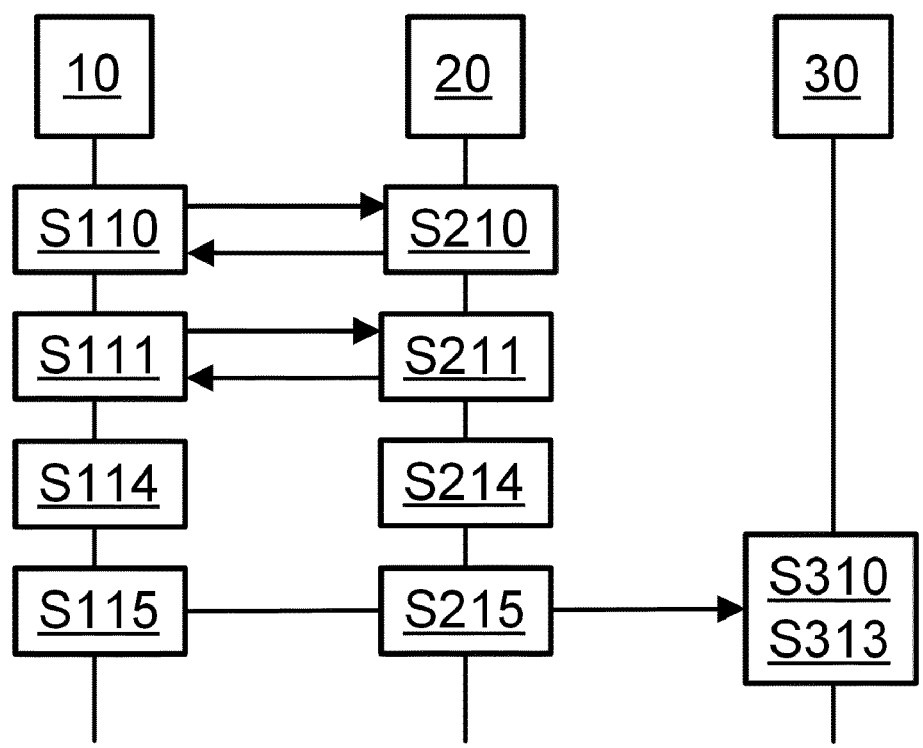
FIG. 3 shows a schematic flow chart of methods according to a second embodiment.

FIG. 3 shows a schematic flow chart of methods according to a second embodiment.

Therein, in a first step S110, the vehicle 10 determines vehicle-specific first identification information by calling it up from an internal memory. In a second step S111, the vehicle 10 determines charging station-specific second identification information by retrieving it from the charging station 20 via a data connection.

In a further step S114, the vehicle detects a signal strength of at least one electromagnetic signal used to position a vehicle 10 defined by the first identification information on the charging station 20 defined by the second identification information. In particular, in this case it is at least one signal strength detected in the optimal charging position of the vehicle 10, wherein it is often a maximum detected signal strength of the electromagnetic signal.

In a further step S115, the vehicle transmits the detected signal strength or an indicator for it to the storage apparatus 30 together with the first identification information and the second identification information.

The storage apparatus 30 receives the detected signal strength or an indicator for it in step S313 and receives the first and second identification information in step S310.

Figure 4:
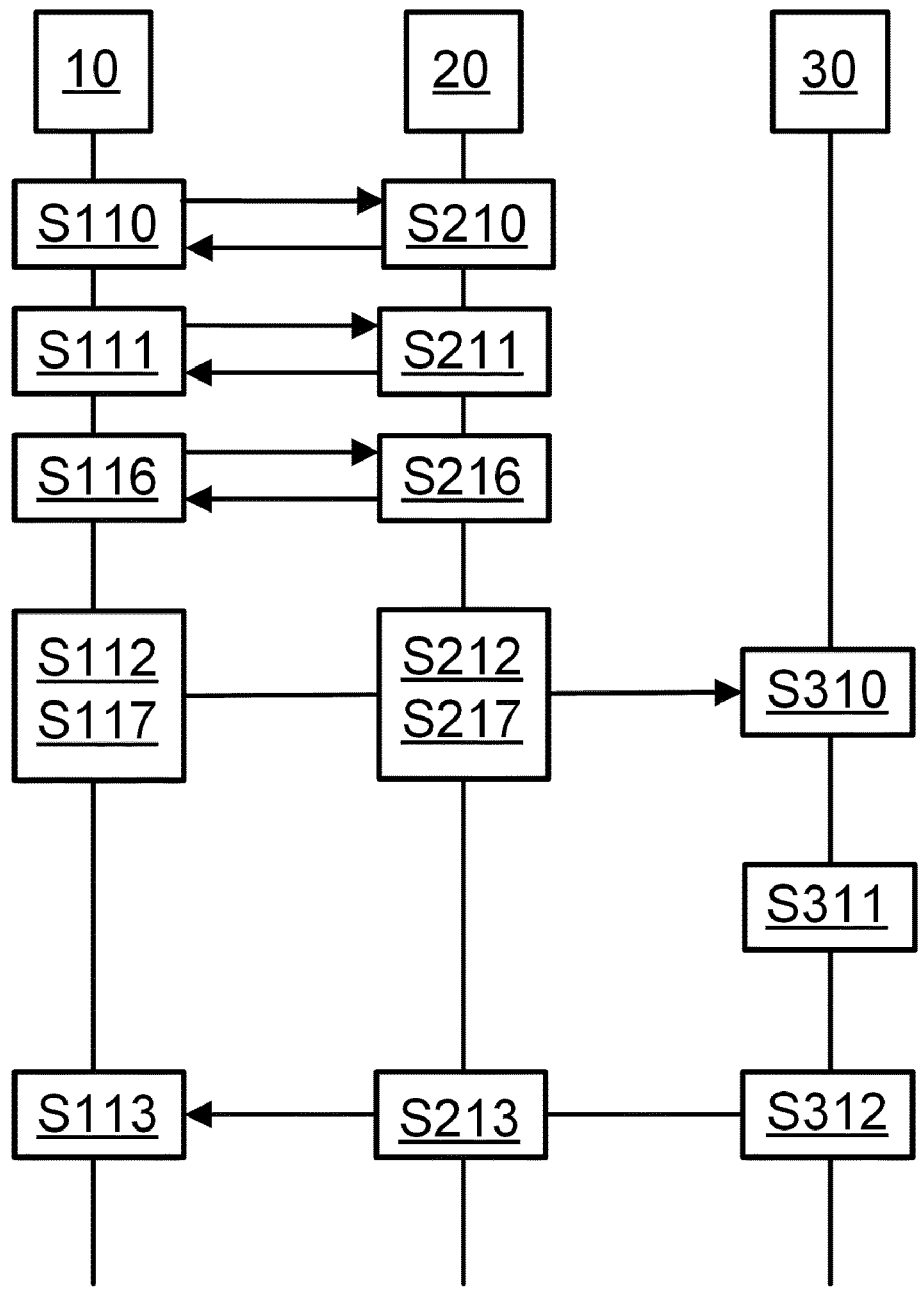
FIG. 4 shows a schematic flow chart of methods according to a third embodiment.

FIG. 4 shows a schematic flow chart of methods according to a third embodiment.

Therein, in a first step S110, the vehicle 10 determines vehicle-specific first identification information by calling it up from an internal memory. In a second step S111, the vehicle 10 determines charging station-specific second identification information by retrieving it from the charging station 20 via a data connection.

In a further step S116, the vehicle 10 determines surroundings-specific third identification information depending on the surrounding conditions 8, 9 of the charging station 20.

In a further step S117, the vehicle transmits the third identification information to the storage apparatus 30 in step S112 together with the transmission of the first and second identification information, which storage apparatus receives the first, second, and third identification information in the step S310 according to this embodiment.

In a second step S311 of the method involving the storage apparatus 30 according to this embodiment, the storage apparatus determines positioning information with at least one item of information about a signal strength of at least one electromagnetic signal used to position the vehicle 10 on the charging station 20. In a third step S312 of the method involving the storage apparatus 30, it transmits positioning information to the vehicle 10 which receives it in step S113.

According to this embodiment, the positioning information has at least one item of information about a signal strength for positioning of at least one vehicle 10 defined by the first identification information on the charging station 20 defined by the second identification information under the surrounding conditions defined by the third identification information.

Figure 5:
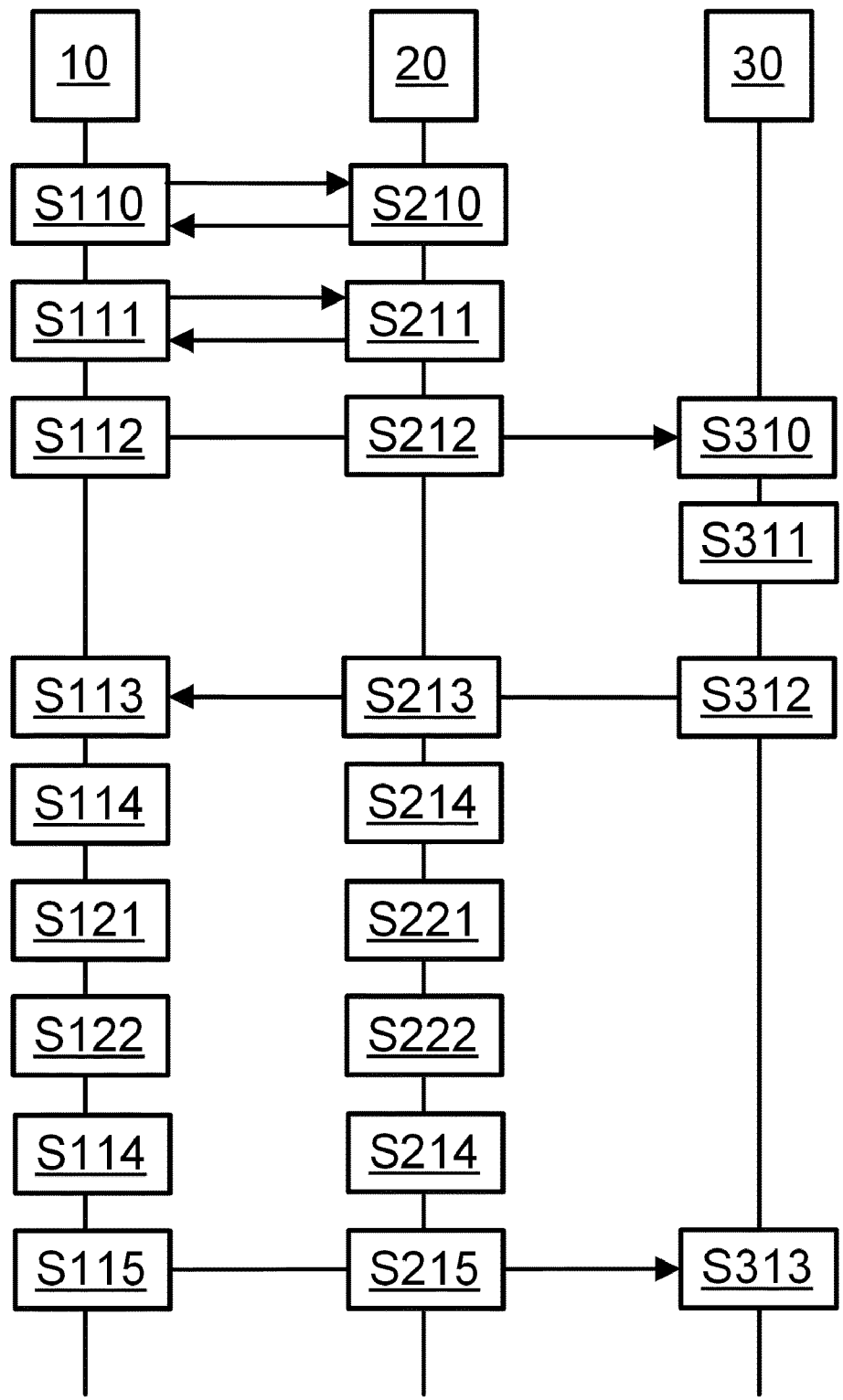
FIG. 5 shows a schematic flow chart of methods according to a fourth embodiment.

FIG. 5 shows a schematic flow chart of methods according to a fourth embodiment.

In a first step S110, the vehicle 10 determines vehicle-specific first identification information by calling it up from an internal memory. In a second step S111, the vehicle 10 determines charging station-specific second identification information by retrieving it from the charging station 20 via a data connection. In a third step S112, the vehicle 10 transmits the first and second identification information to the storage apparatus 30.

The storage apparatus 30 receives the first and second identification information in a first step S310 of the method involving the storage apparatus 30. In a second step S311 of the method involving the storage apparatus 30, it determines positioning information with at least one item of information about a signal strength of at least one electromagnetic signal used to position the vehicle 10 on the charging station 20. In a third step S312 of the method involving the storage apparatus 30, it transmits positioning information to the vehicle 10 which receives the information in step S113 of the method involving the vehicle 10.

In a further step S114, the vehicle detects a signal strength of at least one electromagnetic signal used to position a vehicle 10 defined by the first identification information on the charging station 20 defined by the second identification information. In particular, in this case it is at least one signal strength detected in the optimal charging position of the vehicle 10, wherein it is often a maximum detected signal strength of the electromagnetic signal.

In a further step S121, the vehicle 10 determines navigation information based on the positioning information received in S113 and the signal strength detected in S114, in particular based on a difference of the detected signal strength and a signal strength contained in the positioning information. In a further step S122, the vehicle 10 is guided into an optimal charging position on the charging station 20 based on the determined navigation information.

Once it has arrived in the optimal charging position, in a repeated step S114 the vehicle detects a signal strength of at least one electromagnetic signal used to position a vehicle 10 defined by the first identification information on the charging station 20 defined by the second identification information.

In a further step S115, the vehicle transmits the signal strength detected once again in the optimal charging position or an indicator for it to the storage apparatus 30. The storage apparatus 30 receives this signal strength that has been detected once again or an indicator for it in step S313 and updates the positioning information linked with the first and second identification information based on the data received in S313.

Figure 6:
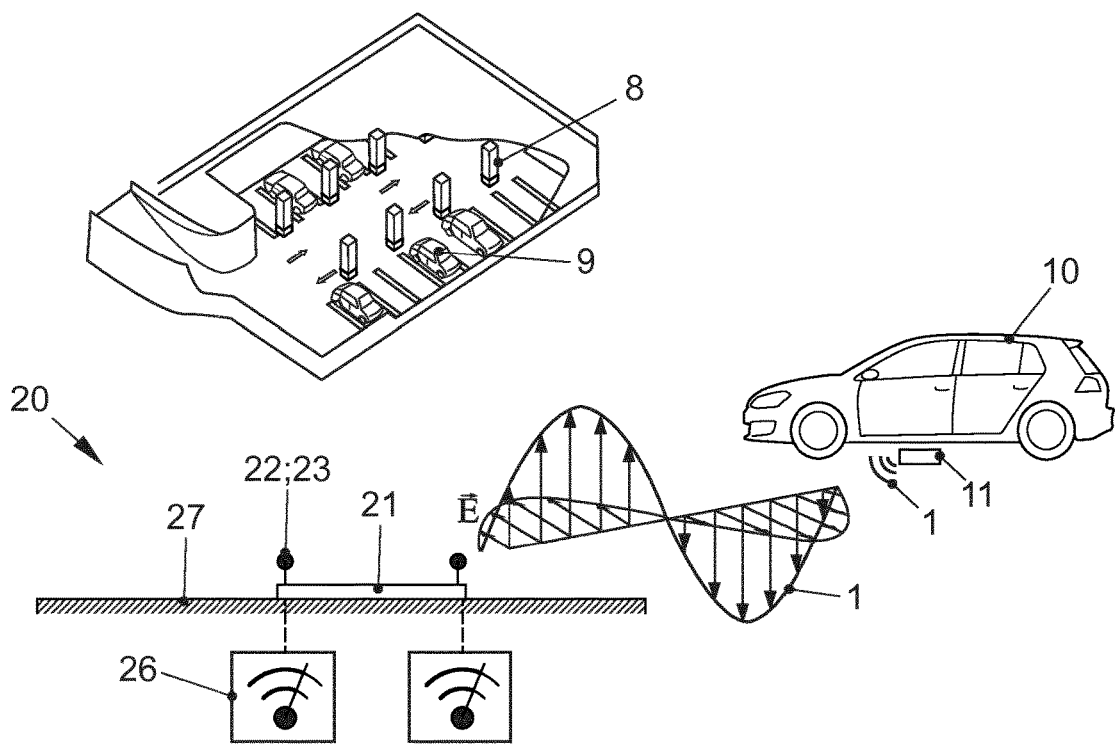
FIG. 6 shows a schematic representation of an LF positioning system.

FIG. 6 shows a schematic representation of an LF positioning system as it can be used to carry out a method according to the disclosure herein.

In this case, the LF positioning system has on the infrastructure side a charging coil 21 of a charging station 20 that is set into the ground 27. Near the charging coil 21, the charging station 20 is equipped with sensors 22, 23 for receiving electromagnetic signals. The sensors 22, 23 are in data communication with at least one control unit 26 which is designed to carry out methods involving a charging station 20.

In an LF positioning method, a vehicle 10 sends out low-frequency LF signals 1 in a frequency band between 100 kHz and 300 kHz by means of vehicle-side LF transmission apparatuses near the charging coil 11. These LF signals are influenced by influences from invariable surrounding conditions 8 as well as by influences from changing surrounding conditions 9 before they are received by the plurality of sensor antennas 22, 23 of the charging station 20. The control apparatus 26 of the charging station 20 determines the received field strength (RSSI) of the received LF signals 1 and transmits them to the storage apparatus (not shown) together with third identification information about the surrounding conditions 8, 9.

Thus, the relationship between the received field strength and surrounding conditions is determined and the determined data is stored in the cloud, for example VW back end, VW cloud, big data, connectivity or the like, for later use. If the relationship between the received field strength and the vehicle distance is therefore known for a combination of surrounding conditions 8, 9, transmission apparatus of the vehicle 10, and receiving apparatus of the charging station 20, it is possible to estimate the distance of the vehicle 10 to the charging station 20 with high accuracy using positioning information received by the storage apparatus.

Figure 7:
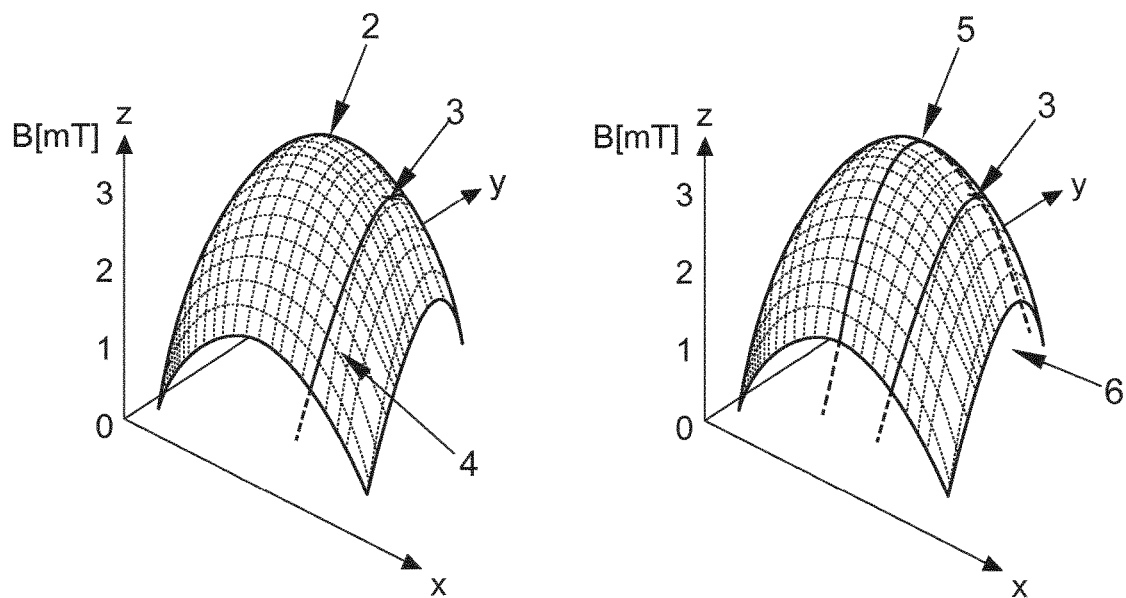
FIG. 7 shows a schematic representation of the field strengths detected in an LPE positioning method.

FIG. 7 shows a schematic representation of the field strengths detected in an LPE positioning method.

For fine positioning by means of an LPE positioning method, a weak magnetic field is established, in particular by a charging coil 21 of a charging station 20, on the infrastructure side which is detected by the vehicle-side charging coil 11.

As soon as the vehicle 10 drives over a local/global maximum, it can extrapolate a maximum from the subsequently decreasing field strength. The left representation in FIG. 7 shows a measured magnetic field strength 2 along a vehicle trajectory 4. Even though a local maximum of the magnetic field 2 is present at position 3, the parking position reached at this point in the trajectory does not correspond to the center of the charging plate 21 in the x direction.

By calling up positioning information from a storage apparatus, a vehicle 10 can now recognize that the local maximum at point 3 does not correspond to the optimal charging position of the charging plate 21. Rather, it receives an archived value of the magnetic field strength 2 at the global maximum 5 as positioning information. Based on this value at the global maximum 5, the value at the local maximum 3, and the gradient information collected along the trajectory 4, navigation information is also determined which is suitable for guiding the vehicle 10 from a position corresponding to the measured value 3 to a position of the global maximum 5.

LIST OF REFERENCE NUMERALS

1 Low-frequency LF signals
2 LPE magnetic field
3 Local maximum
4 Vehicle trajectory
5 Global maximum
6 Navigation information
8 Invariable environment conditions
9 Variable environment conditions
10 Motor vehicle
11 Charging coil
12 Transceiver
13 Transceiver
14 Energy store
15 Communication module
16 Control unit
17 Driving system
18 Sensor
19 Sensor
20 Charging station
21 Charging coil
22 Transceiver
23 Transceiver
24 Electrical grid
25 Communication module
26 Control unit
27 Ground
30 Storage apparatus The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for positioning a vehicle in an optimal charging position on an inductive charging station, comprising:
   determining vehicle-specific first identification information, wherein the first identification information codes or comprises type information of the vehicle;
   determining charging station-specific second identification information;
   transmitting the first identification information and the second identification information to a storage apparatus;
   receiving positioning information from the storage apparatus, which positioning information is based on a combination of the first identification information, the type information, and the second identification information;
   wherein the positioning information comprises at least one item of information, indicative of a signal strength of at least one electromagnetic signal used to position the vehicle defined by the first identification information on the charging station defined by the second identification information.

2. The method of claim 1, furthermore comprising:
   detecting a signal strength of at least one electromagnetic signal used to position the vehicle defined by the first identification information on the charging station defined by the second identification information.

3. The method of claim 2, furthermore comprising:
transmitting the first identification information, the second identification information, and the detected signal strength to the storage apparatus.

4. The method of claim 3, furthermore comprising:
determining navigation information based on the positioning information and the detected signal strength; and
guiding the vehicle into an optimal charging position on the charging station based on the navigation information.

5. The method of claim 3, furthermore comprising:
determining surroundings-specific third identification information depending on the surrounding conditions of the charging station;
transmitting the third identification information to the storage apparatus.

6. The method of claim 3, furthermore comprising:
inductively charging the vehicle on the inductive charging station;
determining an efficiency of the inductive charging process; and
transmitting the determined efficiency to the storage apparatus.

7. The method of claim 3, wherein
at least one transmitter of the charging station or at least one transmitter of the vehicle emits a low-frequency electromagnetic signal as the at least one electromagnetic signal; and
at least one receiver of the vehicle or at least one receiver of the charging station detects a received field strength of the at least one electromagnetic signal.

8. The method of claim 2, furthermore comprising:
determining navigation information based on the positioning information and the detected signal strength; and
guiding the vehicle into an optimal charging position on the charging station based on the navigation information.

9. The method of claim 8, furthermore comprising:
determining surroundings-specific third identification information depending on the surrounding conditions of the charging station;
transmitting the third identification information to the storage apparatus.

10. The method of claim 8, furthermore comprising:
inductively charging the vehicle on the inductive charging station;
determining an efficiency of the inductive charging process; and
transmitting the determined efficiency to the storage apparatus.

11. The method of claim 8, wherein
at least one transmitter of the charging station or at least one transmitter of the vehicle emits a low-frequency electromagnetic signal as the at least one electromagnetic signal; and
at least one receiver of the vehicle or at least one receiver of the charging station detects a received field strength of the at least one electromagnetic signal.

12. The method of claim 2, furthermore comprising:
determining surroundings-specific third identification information depending on the surrounding conditions of the charging station;
transmitting the third identification information to the storage apparatus.

13. The method of claim 2, furthermore comprising:
inductively charging the vehicle on the inductive charging station;
determining an efficiency of the inductive charging process; and
transmitting the determined efficiency to the storage apparatus.

14. The method of claim 2, wherein
at least one transmitter of the charging station or at least one transmitter of the vehicle emits a low-frequency electromagnetic signal as the at least one electromagnetic signal; and
at least one receiver of the vehicle or at least one receiver of the charging station detects a received field strength of the at least one electromagnetic signal.

15. The method of claim 1, furthermore comprising:
determining surroundings-specific third identification information depending on the surrounding conditions of the charging station;
transmitting the third identification information to the storage apparatus.

16. The method of claim 15, furthermore comprising:
inductively charging the vehicle on the inductive charging station;
determining an efficiency of the inductive charging process; and
transmitting the determined efficiency to the storage apparatus.

17. The method of claim 1, furthermore comprising:
inductively charging the vehicle on the inductive charging station;
determining an efficiency of the inductive charging process; and
transmitting the determined efficiency to the storage apparatus.

18. The method of claim 1, wherein
at least one transmitter of the charging station or at least one transmitter of the vehicle emits a low-frequency electromagnetic signal as the at least one electromagnetic signal; and
at least one receiver of the vehicle or at least one receiver of the charging station detects a received field strength of the at least one electromagnetic signal.

19. The method of claim 1, wherein
a charging coil of the charging station emits a magnetic field as the at least one electromagnetic signal; and
one or more of a charging coil and at least one magnetic field sensor of the vehicle detects a local field strength of the emitted magnetic field.

20. A method for operating a storage apparatus, comprising:
receiving vehicle-specific first identification information and charging station-specific second identification information from a vehicle defined by the first identification information or from a charging station defined by the second identification information, wherein the first identification information codes or comprises type information of the vehicle;
determining, using a database, positioning information with at least one item of information indicative of a signal strength of at least one electromagnetic signal used to position the vehicle on the charging station; and transmitting the positioning information to the vehicle or to the charging station to enable positioning the vehicle in an optimal charging position on the inductive charging station.

* * * * *